United States Patent
Tamura et al.

(10) Patent No.: US 6,426,848 B1
(45) Date of Patent: Jul. 30, 2002

(54) NON-MAGNETIC SUBSTRATE INCLUDING TIO$_2$ FOR A MAGNETIC HEAD AND MAGNETIC HEAD

(75) Inventors: Takashi Tamura; Yukari Nihei, both of Miyagi (JP)

(73) Assignee: Sony Corporation, Tokyo (JP)

( * ) Notice: Subject to any disclaimer, the term of this patent is extended or adjusted under 35 U.S.C. 154(b) by 35 days.

(21) Appl. No.: 09/594,782

(22) Filed: Jun. 16, 2000

(30) Foreign Application Priority Data

Jun. 23, 1999 (JP) .............................. 11-177189

(51) Int. Cl.$^7$ .................... G11B 5/127; G11B 5/39; H01F 10/28

(52) U.S. Cl. ................... 360/126; 360/125; 360/313

(58) Field of Search ................... 360/318, 317, 360/125, 126, 313

(56) References Cited

FOREIGN PATENT DOCUMENTS

| JP | 62-95810 | * | 5/1987 |
| JP | 3-279260 | * | 12/1991 |
| JP | 7-297029 | * | 11/1995 |
| JP | 9-221358 | * | 8/1997 |
| JP | 10-64016 | * | 3/1998 |
| JP | 11-147764 | * | 6/1999 |
| JP | 11-175908 | * | 7/1999 |
| JP | 2000-123314 | * | 4/2000 |

* cited by examiner

Primary Examiner—Jefferson Evans
(74) Attorney, Agent, or Firm—Sonnenschein, Nath & Rosenthal

(57) ABSTRACT

The present invention improves the wear resistance and machining characteristic of a non-magnetic substrate. The non-magnetic substrate as a guard member of a magnetic layer constituting a magnetic core is formed by a non-magnetic material containing TiO$_2$ as a main content. Moreover, when the non-magnetic substrate is formed by a non-magnetic material containing TiO$_2$ and NiO as main contents, a content of TiO$_2$ is set to 70 mol % or above.

5 Claims, 2 Drawing Sheets

NON-MAGNETIC SUBSTRATE INCLUDING TIO₂ FOR A MAGNETIC HEAD AND MAGNETIC HEAD

BACKGROUND OF THE INVENTION

1. Field of the Invention

The present invention relates to a non-magnetic substrate for a magnetic head having on its main surface various components constituting a magnetic head. Moreover, the present invention relates to a magnetic head having various components for recording and/or reproducing.

2. Description of Prior art

A magnetic head is mounted on a magnetic recording/reproducing apparatus for recording and/or reproducing of an information signal onto/from a magnetic recording medium (hereinafter, referred to as recording/reproducing). Such a magnetic recording/reproducing apparatus may be, for example, a video tape recorder (VTR) and a digital audio tape (DAT) having a magnetic head on a drum rotating at a high speed wherein a tape-shaped magnetic recording medium slides along the drum, so that recording/reproducing is performed by the so-called helical scan method. Moreover, a hard disc drive (HDD) and a floppy disc drive (FDD) are used for performing recording/reproducing by a magnetic head for a disc-shaped magnetic recording medium such as a magnetic disc and a magneto-optical disc.

A magnetic head is normally constituted by a coil wound around a magnetic core made from a magnetic material having a high permeability. Such a magnetic head is called electromagnetic inductive type magnetic head because recording/reproducing is performed to/from a magnetic recording medium using electromagnetic inductance between a magnetic core and a coil.

A conventional magnetic head has a magnetic core constituted by two magnetic core half bodies made by machining a bulk magnetic material which are combined via a magnetic gap. Recently, however, a higher magnetic density of a magnetic signal is required and it is necessary to accurately record/reproduce a small magnetic signal. However, conventional magnetic head in which a magnetic core is formed by machining a bulk material cannot obtain a sufficiently narrow track and a sufficiently narrow gap.

To cope with this, a magnetic head for a high recording density has been suggested and used in practice such as a layered type magnetic head, thin film type magnetic head, a magnetoresistive head (MR head).

The layered magnetic head is prepared as follows. A metal magnetic layer is sandwiched by a non-magnetic substrate as a guard material, thus obtaining a magnetic core half body. A pair of magnetic core half bodies are attached to each other by glass melting or the like. In the layered type magnetic head, a pair of magnetic core half bodies are connected via a glass, so that the metal magnetic layer serves as a magnetic core.

In the thin film type magnetic head, various head elements such as a magnetic core and a magnetic coil are formed on a non-magnetic substrate by various thin film processing techniques such as dry etching. The thin film type magnetic head in which various head members are formed by the thin film processing technique has an advantage that a highly accurate magnetic head can be produced in a large quantity.

The MR head has a magnetoresistive element (MR element) formed on a non-magnetic substrate and is dedicated for reproducing. The MR head which does not require a magnetic coil can be produced in a small size and has a high sensitivity. Accordingly, the MR head attracts attention as a magnetic head for high recording density.

In the aforementioned various magnetic heads, the non-magnetic substrate is made from MnO—NiO, Al₂O₃—TiC, or the like.

The aforementioned MnO—NiO system material and Al₂O₃—TiC system material have a wear resistance smaller than a ferrite single crystal, for example. Accordingly, a magnetic head having a non-magnetic substrate formed from such a material has a greater wear by the sliding of the magnetic recording medium, compared to a ferrite magnetic head and a MIG (metal in gap) magnetic head having a magnetic core formed from a ferrite single crystal. That is, there is a problem that the service life as a magnetic head is very short. The wear is especially remarkable when used at a low temperature with a high humidity.

Moreover, in a case of the MR head, if the non-magnetic substrate is worn away, the bias state and the resistance of the MR element are greatly deviated from the initial state, deteriorating the reproducing output and the output waveform. When the MR head is used as a floating type magnetic head wherein a magnetic recording medium does not slide, there is no problem of wear of the non-magnetic substrate. However, when the MR head is used in a video tape recorder for helical scan type reproducing, the non-magnetic substrate has a problem of wear and it is difficult to obtain a stable high accuracy in reproducing operation.

Furthermore, a magnetic head having a non-magnetic substrate formed from the aforementioned MnO—NiO or Al₂O₃—TiC, has a problem during a production procedure that a grindstone is easily worn out when grinding the sliding surface of the magnetic recording medium. That is, such a magnetic head. requires frequent replacement of the grindstone.

SUMMARY OF THE INVENTION

It is therefore an object of the invention to provide a non-magnetic substrate for a magnetic head having an excellent wear resistance and excellent property for machining. Another object of the present invention is to provide a magnetic head having a non-magnetic substrate having an excellent wear resistance and excellent property for machining.

The non-magnetic substrate for a magnetic head according to the present invention is formed by a non-magnetic material containing TiO₂ as a main content.

The non-magnetic substrate for a magnetic head having the aforementioned configuration has a sufficiently excellent wear resistance.

Moreover, the non-magnetic substrate for a magnetic head according to the present invention is formed by a non-magnetic material containing TiO₂ and NiO as main contents wherein a content of TiO₂ is equal to or above 70 mol % and below 100 mol %.

The non-magnetic substrate for a magnetic head having the aforementioned configuration has a sufficiently excellent wear resistance and machining characteristic.

Furthermore, the magnetic head according to the present invention includes a non-magnetic substrate on which components for performing recording and/or reproducing are arranged, the non-magnetic substrate is formed by a non-magnetic material containing TiO₂ as a main content.

The magnetic head having the aforementioned configuration has a sufficiently excellent wear resistance and suppresses wear by sliding of a magnetic recording medium.

Moreover, the magnetic head according to the present invention includes a non-magnetic substrate on which components for performing recording and/or reproducing are arranged. The non-magnetic substrate is formed by a non-magnetic material containing $TiO_2$ and NiO as main contents wherein a content of $TiO_2$ is equal to or above 70 mol % and below 100 mol %.

The magnetic head having the aforementioned configuration has a sufficiently excellent wear resistance and suppresses wear by sliding of a magnetic recording medium. Moreover, the magnetic head has a sufficiently excellent machining characteristic and can reduce the time required for grinding, thus contributing to improvement of productivity.

DESCRIPTION OF THE PREFERRED EMBODIMENTS

Hereinafter, explanation will be given on embodiments of the present invention with reference to the attached drawings. Hereinafter, explanation will be given on a magnetic head 1 as shown in FIG. 1 as an example of the magnetic head according to the present invention.

Figure 1:
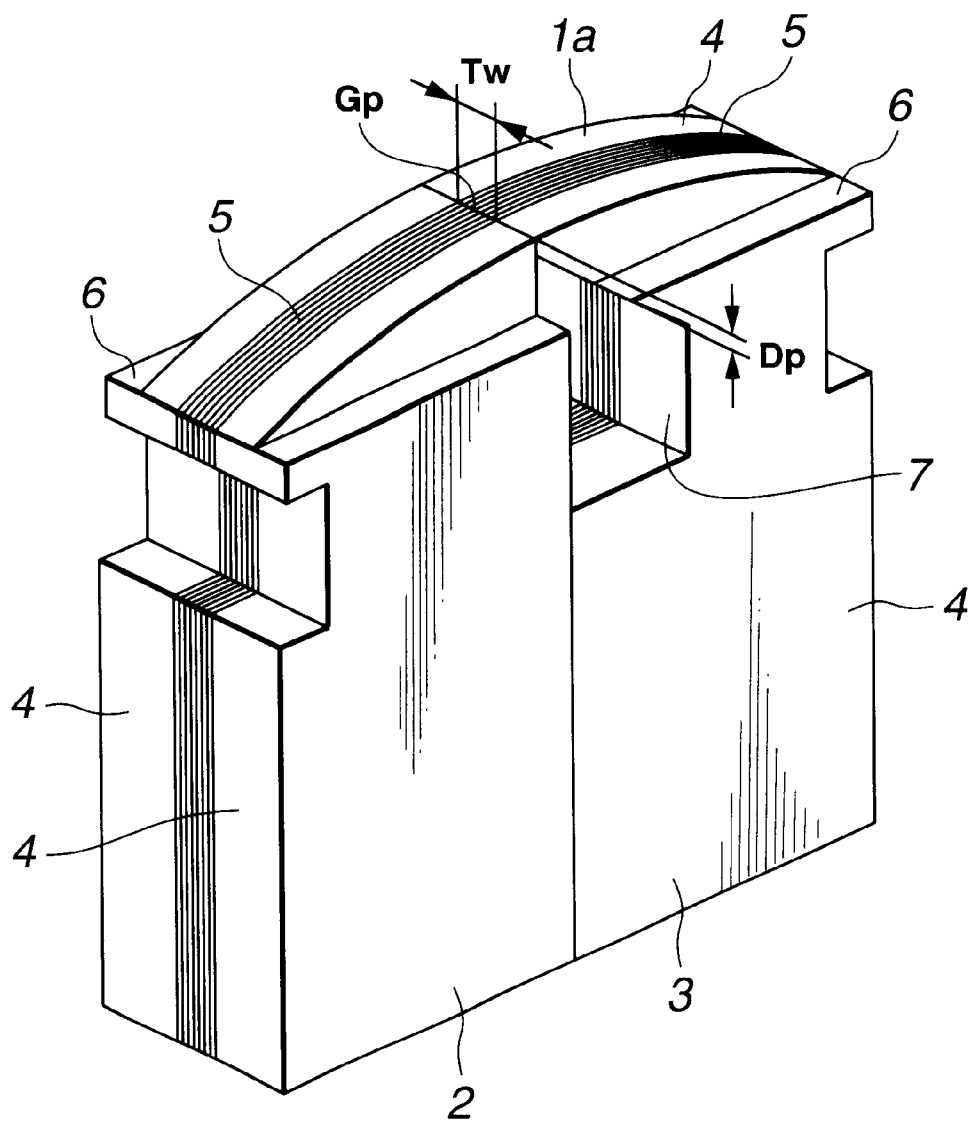
FIG. 1 is a schematic perspective view of a layered type magnetic head as an example of a magnetic head according to the present invention.

As shown in FIG. 1, the magnetic head 1 consists of a first magnetic core half body 2 and a second magnetic core half body 3 which are attached to each other via a magnetic gap Gp and made into a unitary block. Moreover, each of the first magnetic core half body 2 and the second magnetic core half body 3 includes a magnetic layer 5 sandwiched by a pair of non-magnetic substrates 4 and made into a unitary block. In the magnetic head 1, the first magnetic core half body 2 and the second magnetic core half body 3 are attached to each other with the respective magnetic layers 5 whose end surfaces are attached to each other via a magnetic gap Gp and made into a unitary block by glass melting.

Moreover, the magnetic layer 5 of the first magnetic core half body 2 and the magnetic layer 5 of the second magnetic core half body 3 are attached to each other via the magnetic gap Gp so as to constitute a closed loop where a magnetic flux flows, i.e., a magnetic core. In this magnetic head 1, a track width Tw is regulated by a film thickness of the magnetic layer 5 since the non-magnetic substrates 4 arranged at both sides of the magnetic layer 5 constituting the magnetic core are non magnetic members.

In the magnetic head 1, a contact width regulating groove 6 is formed along the sliding direction of a magnetic recording medium, at both sides of the medium sliding surface 1a where a magnetic recording medium slides. That is, in the magnetic head 1, the length of the medium sliding surface 1a in the contact width direction is regulated by a pair of contact width regulating grooves 6.

Moreover, in the magnetic head 1, a winding window 7 is formed at the contact surface of the first magnetic core half body 2 and the second magnetic core half body 3, for regulating the length of the magnetic gap Gp in the depth Dp direction and for winding a coil (not depicted). In this magnetic head 1, a coil is wound in this winding window.

When the magnetic head 1 performs recording operation with respect to a magnetic recording medium, an electric current corresponding to a recording signal is supplied to the coil, which generates a magnetic flux in the magnetic core constituted by the magnetic layers 5. This flux leaks from the magnetic gap Gp on the medium sliding surface 1a and the leak magnetic flux is applied to the magnetic recording medium so as to record a magnetic signal onto the magnetic recording medium.

Moreover, when the magnetic head 1 performs reproducing with respect to a magnetic recording medium, the magnetic head 1 detects a magnetic signal recorded on the magnetic recording medium, through the magnetic gap Gp and generates a magnetic flux corresponding to the magnetic signal, in the magnetic core. The magnetic flux generated in the magnetic core is converted into an electric signal by the coil. Thus, the magnetic signal recorded on the magnetic recording medium is reproduced as an electric signal.

Figure 2:
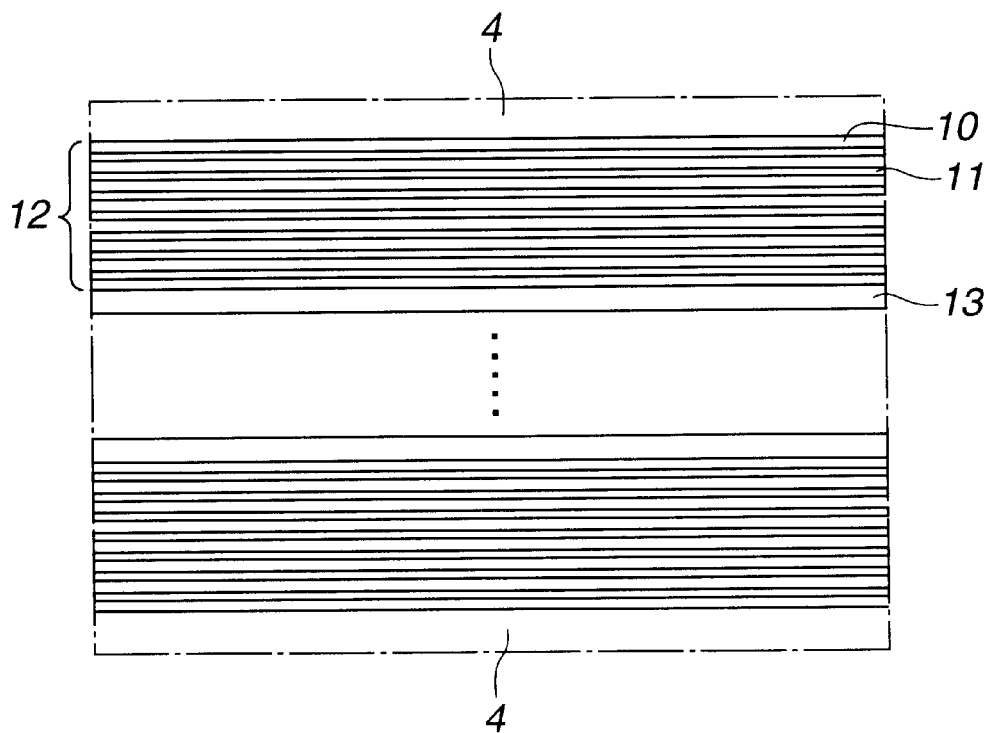
FIG. 2 is a schematic plan view of a medium sliding surface of the magnetic head.

Referring to FIG. 2, in the magnetic head 1, the magnetic layer 5 is constituted by a plurality of unit layered films 12 layered via an insulation film 13. Each of the unit layered films consists of magnetic thin films 10 and non-magnetic thin films 11 alternately layered. That is, the magnetic head 1 is constituted as a so-called layered magnetic head. The magnetic head 1 in which the magnetic layers 5 constituting the magnetic core have the aforementioned layered configuration can reduce lowering the eddy current loss and improve the head efficiency. It should be noted that FIG. 2 shows an enlarged view of the medium sliding surface 1a of the magnetic head 1. Moreover, FIG. 2 shows only a portion of the layered configuration of the magnetic layer 5.

In the magnetic head 1, the magnetic layer 5 can have a configuration as follows. For example, the magnetic thin film 10 is made from a CoZrNbTa amorphous material with a film thickness in the order of 240 nm, the non-magnetic thin film 11 is made from $SiO_2$ with a film thickness in the order of 10 nm, and the insulation film 13 is made from $SiO_2$ with a film thickness in the order of 200 nm. Moreover, in the magnetic head 1, for example, the unit layered film 12 can be made from eight magnetic thin films 10 layered via the non-magnetic thin film 11, and seven of the unit layered films 12 are layered via the insulation film 13.

It should be noted that the present invention is not to be limited to the materials and layered configuration shown here as an example, but can select various materials and layered configuration according to a purpose and recording/reproducing characteristics. More specifically, the magnetic thin film may be formed from a FeTaN/Pt alloy with a film thickness in the order of 330 nm, or the unit layered film 12 may consist of five layers layered via the insulation film 13. Moreover, the magnetic thin film 10 may be constituted by an amorphous alloy of at least one element selected from a group consisting of Fe, Ni, and Co, and at least one element selected from a group consisting of P, C, B, and Si, or a metal-metalloid alloy containing these elements as main contents with addition of Al, Ge, Be, Sn, In, Mo, W, Ti, Mn, Cr, Zr, Hf, Nb, or the like, or a metal-metal amorphous alloy containing as main contents the transition elements such as Co, Hf, Zr, or the like and rare earth elements.

Moreover, the magnetic thin film 10 may be constituted by a layered configuration of a magnetic thin film layer showing a preferable soft magnetic characteristic and a metal thin film layer formed by Pt, Ag, Au, Pd, or the like. This enables the magnetic head 1 to suppress the magnetic anisotropy of the magnetic layer 5.

In the magnetic head 1, the non-magnetic substrate 4 has a function as a guard member for maintaining the magnetic layer 5 constituting the magnetic core with respect to a magnetic recording medium. If the non-magnetic substrate 4 is worn out by sliding of the magnetic recording medium along the medium sliding surface 1a, the depth Dp is worn out for a short period of time and normal recording/reproducing operation is disabled. Moreover, if the non-magnetic substrate 4 is worn out, the shape and depth Dp of the magnetic gap Gp are changed, deteriorating the recording/reproducing characteristics.

However, in the magnetic head 1, the non-magnetic substrate 4 is formed from a non-magnetic material containing $TiO_2$ as a main content. Accordingly, the non-magnetic layer 4 has a sufficient wear resistance, suppressing the wear due to sliding of the magnetic recording medium. Thus, the magnetic head 1 can suppress the wear amount of the medium sliding surface 1a, enabling to obtain a long stable service life even if the magnetic recording medium slides at a high speed along the medium sliding surface 1a for assuring a high transfer rate.

Moreover, the non-magnetic substrate 4 may be formed from a non-magnetic material containing $TiO_2$ and NiO as main contents. When the non-magnetic substrate 4 is formed from such a non-magnetic material containing $TiO_2$ and NiO as main contents, it is possible to improve the sintering characteristic as well as to improve the machining characteristic. More specifically, when grinding the contact width regulating groove 6 using a grindstone, it is possible to suppress the wear amount of the grindstone, thus improving the productivity. It should be noted that in this case, considering the wear amount of the grindstone, it is preferable that the content of $TiO_2$ be 70 mol % or above as will be detailed later.

As has been described above, by using the non-magnetic substrate 4 according to the present invention as a guard member in the magnetic head 1, it is possible to suppress the wear amount of the medium sliding surface 1a and realize a magnetic head which can be used for a long period of time as well as to improve the machining characteristic so as to increase the productivity of the magnetic head 1. It should be noted that non-magnetic substrate for a magnetic head is not to be limited to the use for the aforementioned magnetic head 1 but can be applied to various other magnetic heads with the aforementioned merits.

Figure 3:
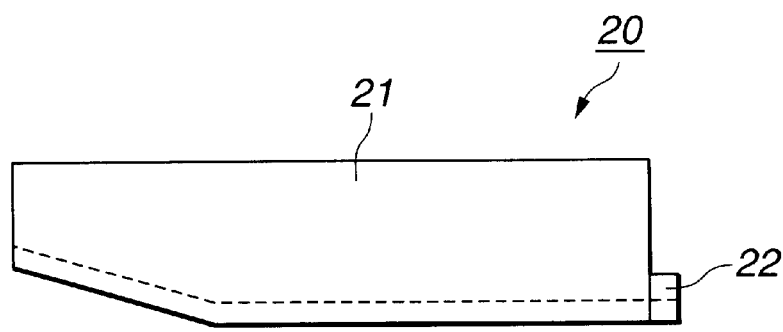
FIG. 3 is a schematic side view of a magnetic bead having a Winchester type slider as another example of the magnetic head according to the present invention.

The non-magnetic substrate for a magnetic head according to the present invention can also be applied to a magnetic head 20 as shown in FIG. 3. The magnetic head 20 includes a non-magnetic substrate 21 which is a so-called Winchester type slider and a magnetic head element 22 attached to one side of the non-magnetic substrate 21. It should be noted that the broken line in FIG. 3 shows a groove formed in the longitudinal direction of this magnetic head 20, on the medium sliding surface of the magnetic head. Since such a groove is formed on the medium sliding surface of the magnetic head 20, it is possible to regulate a floating amount and a floating angle with respect to a magnetic recording medium.

In the magnetic head 20, the non-magnetic substrate 21 may be formed as the non-magnetic substrate for a magnetic head according to the present invention, which can be used as a substrate of the magnetic head element 22. This enables the magnetic head 20 to have an excellent wear resistance and machining characteristic in the same way as the aforementioned magnetic head 1.

It should be noted that in the magnetic head 20, the magnetic head element 22 may be formed as a so-called inductance type magnetic head including a magnetic core constituted by a magnetic material, or a so-called MR type magnetic head including a magnetoresistive element for reading through magnetoresistance effect a magnetic signal recorded on a magnetic recording medium.

Moreover, the magnetic head substrate according to the present invention is not to be limited to the aforementioned magnetic head 1 and the magnetic head 20 but can be applied to various inductance type magnetic heads and MR type magnetic heads. Moreover, it can be applied to a magnetic head for applying a bias magnetic field when recording is performed with respect to a magneto-optical recording medium. Moreover, the magnetic head substrate according to the present invention is not to be limited to particular magnetic head structures, slider shapes, or purposes.

Especially in an MR type magnetic head, if a non-magnetic substrate as a guard member is worn out, the bias state and a resistance value of the MR element are greatly changed. For this, it has been difficult to apply an MR type magnetic head, for example, to the helical scan method of recording/reproducing where the relative sliding speed and sliding amount with a magnetic recording medium are large. However, by applying the magnetic head substrate according to the present invention to an MR type magnetic head, it is possible to reduce the wear amount of the guard member of the MR type magnetic head. That is, by applying the non-magnetic substrate according to the present invention to the MR type magnetic head, it is possible to simultaneously obtain the MR type magnetic head characteristic, high sensitivity for high recording density, and employ the helical scan method.

Next, explanation will be given on magnetic head substrates which we actually produced and experiments for checking the wear resistance and machining characteristic. Firstly, we prepared a plurality of substrate samples containing different amounts of NiO as follows.

That is, we weighed out a $TiO_2$ power and a NiO powder available on market so that a $TiO_2$ content and a NiO content are at a predetermined ratio. The powders were placed into a ball mill and pure water was added to perform wet mixture for 24 hours. Next, the mixture obtained is dried at 100° C. for 20 hours or more and then roughly crushed by Ishikawa type Raikai machine, after which the crushed materials was calcined at 900° C. for 5 hours or more. Next, the calcined and sintered material was again crushed into powder by the Ishikawa type Raikai machine.

Next, the crushed powder was added again with pure water and subjected to wet mixture in a ball mill for 24 hours. Next, the obtained mixture was dried at 100° C. for 20 hours or more and crushed by the Ishikawa type Raikai machine. Then, a 10 weight % aqueous solution of polyvinyl alcohol (PVA) was added by 10 weight % of the total powder weight, and the mixture was made into pellets.

Next, the pellets were pressed by 80 Mpa into a flat shape and calcined in oxygen at 1200° C. to 1400° C. Next, while applying 100 MPz of Ar gas, hot isotropic press (HIP) was performed within a temperature range from 1100° C. to 1350° C. so as to prepare a plurality of substrate samples having different contents of $TiO_2$.

Evaluation Tests of Wear Resistance

The plurality of substrate samples were made into a shape similar to the aforementioned magnetic head so as to obtain dummy heads for VTR. Each of the dummy heads had a size of 1.5 mm in width, 2 mm in height, and 0.2 mm in thickness. The contact width on the medium sliding surface 1a where a magnetic recording medium slides was set to 80 micrometers. Moreover, the curvature in the contact width direction on the medium sliding surface 1a was set to R 6 mm.

The dummy heads were mounted on the data storage tape drive deck (SDX-S300C) produced by Sony co., Ltd., and a Co alloy thin film deposition tape (SDX-T3N) produced by Sony Co., Ltd. was made to run in the environment of 10° C. and 50% RH for 1000 hours. The change of the stick out amount of a dummy head from the drum was measured as a wear amount. It should be noted that as the wear amount is smaller, the wear resistance is better. The initial value of the dummy bead stick out amount from the drum was set to 30 micrometers.

Evaluation Tests of Machining Characteristic

For this evaluation, a slicing machine normally used is used to insert a rotary grindstone by 50 passes to the plurality of substrate samples thus obtained. For each of the substrate samples, the wear amount of the rotary grindstone was checked. That is, an initial groove depth of the rotary grindstone and the groove depth after the 50 passes were measured for each of the substrate samples. The smaller the wear amount of the rotary grindstone is, the better the machining characteristic is. The grindstone used for this evaluation is SD3/8 (R200). The rotation was set to 5000 rpm, the rotary grindstone feed speed was set to 30 mm/min., and the cutting depth was set to 0.1 mm.

Table 1 below shows the evaluation results for the respective substrate samples. It should be noted that Table 1 also contains comparative examples processed into a shape identical to the substrate samples. The comparative examples were made from materials conventionally used. That is, the first comparative example was made from a MnO—NiO material; the second comparative example was made from $Al_2O_3$—TiC; and the third comparative example was made from a MnZn ferrite material.

TABLE 1

| | Material Composition (mol %) | | Wear amount | Grindstone |
|---|---|---|---|---|
| | $TiO_2$ | NiO | (μm) | wear (μm) |
| Substrate sample 1 | 0 | 100 | 15 | 25 |
| Substrate sample 2 | 10 | 90 | 11 | 20 |
| Substrate sample 3 | 20 | 80 | 9 | 15 |
| Substrate sample 4 | 30 | 70 | 6 | 10 |
| Substrate sample 5 | 40 | 60 | 4 | 8 |
| Substrate sample 6 | 50 | 50 | 0.1 | 7 |
| Substrate sample 7 | 55 | 45 | 0.1 | 6 |
| Substrate sample 8 | 60 | 40 | 0.1 | 5 |
| Substrate sample 9 | 65 | 35 | 0.1 | 4 |
| Substrate sample 10 | 70 | 30 | 0.1 | 1 |
| Substrate sample 11 | 75 | 25 | 0.1 | 1 |
| Substrate sample 12 | 80 | 20 | 0.1 | 1 |
| Substrate sample 13 | 85 | 15 | 0.1 | 1 |
| Substrate sample 14 | 90 | 10 | 0.1 | 1 |
| Substrate sample 15 | 95 | 5 | 0.1 | 1 |
| Substrate sample 16 | 100 | 0 | 0.1 | 1 |
| Comparative example 1 | MnO-NiO | | 8 | 20 |
| Comparative example 2 | $Al_2O_3$-TiC | | 4 | 15 |
| Comparative example 3 | MnZn ferrite | | 4 | 1 |

As is clear from Table 1, the substrate samples 1 to 5 containing $TiO_2$ by 40 mol % or below show a greater wear amount than the comparative example 3 prepared by the MnZn ferrite material. Accordingly, when the substrate samples 1 to 5 are used as a magnetic head guard member or slider, the wear is too large, reducing its service life.

Moreover, the substrate samples 1 to 9 containing $TiO_2$ by 70 mol % or below show greater grindstone wear values by more than four times compared to comparative example 3. Especially, the substrate samples 1 to 3 containing $TiO_2$ by 20 mol % or below show grindstone wear values equal to or greater than the comparative example 1 prepared by the MnO-NiO material and the comparative example 2 prepared by the $Al_2O_3$—TiC material. Accordingly, the substrate samples 1 to 9 have adverse machining characteristic and when they are applied to the magnetic head guard member or the slider, it is difficult to improve productivity.

On the contrary, the substrate samples 10 to 16 containing $TiO_2$ by 70 mol % or above show significantly preferable wear resistance, i.e., the wear amounts on the medium sliding surface are about 1/40 of the second and the third comparative example. Moreover, the substrate samples 10 to 16 show a grindstone wear amount equal to that of the third comparative example, i.e., a preferable machining characteristic.

Moreover, as is clear from Table 1, as the content of NiO is increased and the content of $TiO_2$ is decreased, the wear amount on the medium sliding surface and the grindstone wear amount increase. Accordingly, it is preferable that the magnetic head non-magnetic substrate be prepared from a material containing $TiO_2$ as a main content. However, as has been described above, by mixing NiO, it is possible to improve the sintering characteristic of the magnetic head non-magnetic substrate, improving the productivity. Taking this into consideration, when mixing NiO and preparing the non-magnetic substrate from a material containing $TiO_2$ and NiO as main contents, it is preferable that the content of $TiO_2$ be 70 mol % or above.

From the aforementioned results, it can be said that the magnetic bead non-magnetic substrate prepared from a material containing $TiO_2$ as a main content or the magnetic head non-magnetic substrate prepared from a material containing $TiO_2$ and NiO as main contents in which $TiO_2$ content is 70 mol % or above show excellent wear resistance and machining characteristic. Moreover, a magnetic head having such a magnetic head non-magnetic substrate shows excellent wear resistance and machining characteristic, a long and stable service life, and a high productivity.

As has been explained above, the non-magnetic substrate for a magnetic head according to the present invention has a sufficiently excellent wear resistance and machining characteristic. Accordingly, a magnetic head prepared using this non-magnetic substrate suppresses a wear amount of the non-magnetic substrate and shows a long stable service life even when it is used for sliding of a magnetic recording medium as when recording/reproducing is performed by the helical scan method. Moreover, when an MR head is prepared using this non-magnetic substrate, it is possible to suppress changes of the bias state and resistance value of the MR element and realizes a magnetic head for a high recording density with a high reliability. Furthermore, the magnetic head non-magnetic substrate according to the present invention shows a sufficiently excellent machining characteristic and can reduces the number of replacements of the grindstone during the magnetic head production process, thus contributing to improvement of the productivity of the magnetic head.

Moreover, the magnetic head according to the present invention has a sufficiently excellent wear resistance and machining characteristic. Accordingly, even when this magnetic head is used for recording/reproducing by the helical scan method where a magnetic recording medium slides, it is possible to suppress the wear amount on the sliding surface of the magnetic recording medium, thus enabling to obtain a long and stable service life. Moreover, especially when an MR head is prepared according to the present invention, it is possible to suppress changes of the bias state and resistance value of the MR element and realize a magnetic head for a high recording density with a high reliability. Furthermore, the magnetic head according to the present invention has a sufficiently excellent machining characteristic and can reduce the replacement frequency of the grindstone, thus contributing to improve the productivity.

What is claimed is:

1. A non-magnetic substrate for a magnetic head, said non-magnetic substrate being formed by a non-magnetic material consisting of $TiO_2$ and NiO wherein a content of $TiO_2$ is equal to or above 70 mol % and below 100 mol %.

2. A magnetic head including a non-magnetic substrate on which components for performing recording and/or reproducing are arranged, said non-magnetic substrate being formed by a non-magnetic material consisting of $TiO_2$ and NiO wherein a content of $TiO_2$ is equal to or above 70 mol % and below 100 mol %.

3. A magnetic head as claimed in claim 2, wherein said components include a magnetoresistive element for reading a magnetic signal by the magnetoresistance effect.

4. A magnetic head as claimed in claim 2, wherein said component include a magnetic core formed by a magnetic material.

5. A magnetic head as claimed in claim 4, wherein a pair of magnetic core half bodies each including a magnetic layer sandwiched between a pair of said non-magnetic substrates are made into a unitary block via a magnetic gap, said magnetic layer constituting the magnetic core.

* * * * *